(12) United States Patent
Oh et al.

(10) Patent No.: US 12,107,347 B2
(45) Date of Patent: Oct. 1, 2024

(54) ANTENNA MODULE FOR WIRELESS POWER TRANSMISSION AND RECEPTION

(71) Applicant: AMOTECH CO., LTD., Incheon (KR)

(72) Inventors: Gyujin Oh, Incheon (KR); Eulyoung Jung, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 131 days.

(21) Appl. No.: 17/914,315

(22) PCT Filed: Mar. 24, 2021

(86) PCT No.: PCT/KR2021/003614
§ 371 (c)(1),
(2) Date: Sep. 23, 2022

(87) PCT Pub. No.: WO2021/194240
PCT Pub. Date: Sep. 30, 2021

(65) Prior Publication Data
US 2023/0118173 A1     Apr. 20, 2023

(30) Foreign Application Priority Data

Mar. 25, 2020   (KR) .................. 10-2020-0036454

(51) Int. Cl.
*H01Q 7/00*      (2006.01)
*H01Q 1/38*      (2006.01)
*H02J 50/10*     (2016.01)

(52) U.S. Cl.
CPC .................. *H01Q 7/00* (2013.01); *H01Q 1/38* (2013.01); *H02J 50/10* (2016.02)

(58) Field of Classification Search
CPC .............. H01Q 7/00; H01Q 1/38; H02J 50/10
See application file for complete search history.

(56) References Cited

U.S. PATENT DOCUMENTS

| | | | |
|---|---|---|---|
| 10,658,870 | B2 | 5/2020 | Jang |
| 2019/0363584 | A1 | 11/2019 | Leem |
| 2021/0328628 | A1 | 10/2021 | Baek et al. |
| 2021/0336341 | A1 | 10/2021 | Baek et al. |

FOREIGN PATENT DOCUMENTS

| | | | |
|---|---|---|---|
| JP | 2004145453 A | * | 5/2004 |
| KR | 10-2016-0135677 A | | 11/2016 |
| KR | 10-2018-0064740 A | | 6/2018 |
| KR | 10-2030577 B1 | | 10/2019 |
| KR | 10-2020-0026140 A | | 3/2020 |
| KR | 10-2020-0028866 A | | 3/2020 |

* cited by examiner

*Primary Examiner* — Robert L Deberadinis
(74) *Attorney, Agent, or Firm* — Maschoff Brennan

(57) ABSTRACT

Presented is an antenna module for wireless power transmission and reception in which an inner loop pattern is disposed in the inner peripheral area of an outer loop coil so as to provide a constant charging recognition rate regardless of location. The presented antenna module for wireless power transmission and reception comprises: a base substrate; a first antenna which is disposed on the upper surface of the base substrate and includes a first radiation pattern forming a first loop; and a second antenna which is stacked on the upper surface of the base substrate and includes a coil wound along the outer periphery of the first loop to form a second loop.

19 Claims, 19 Drawing Sheets

[Fig. 1]
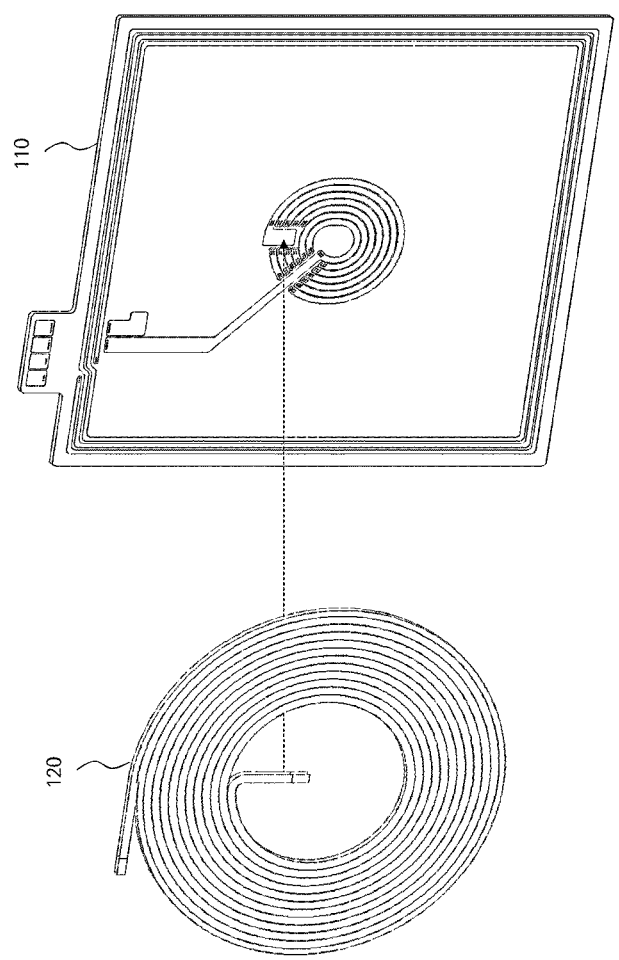

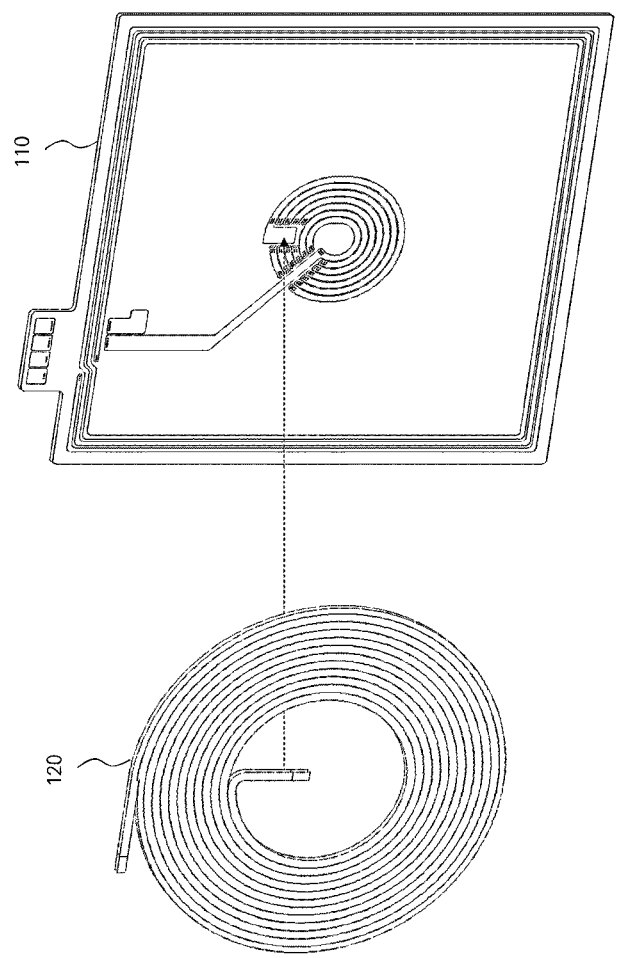
[Fig. 2]

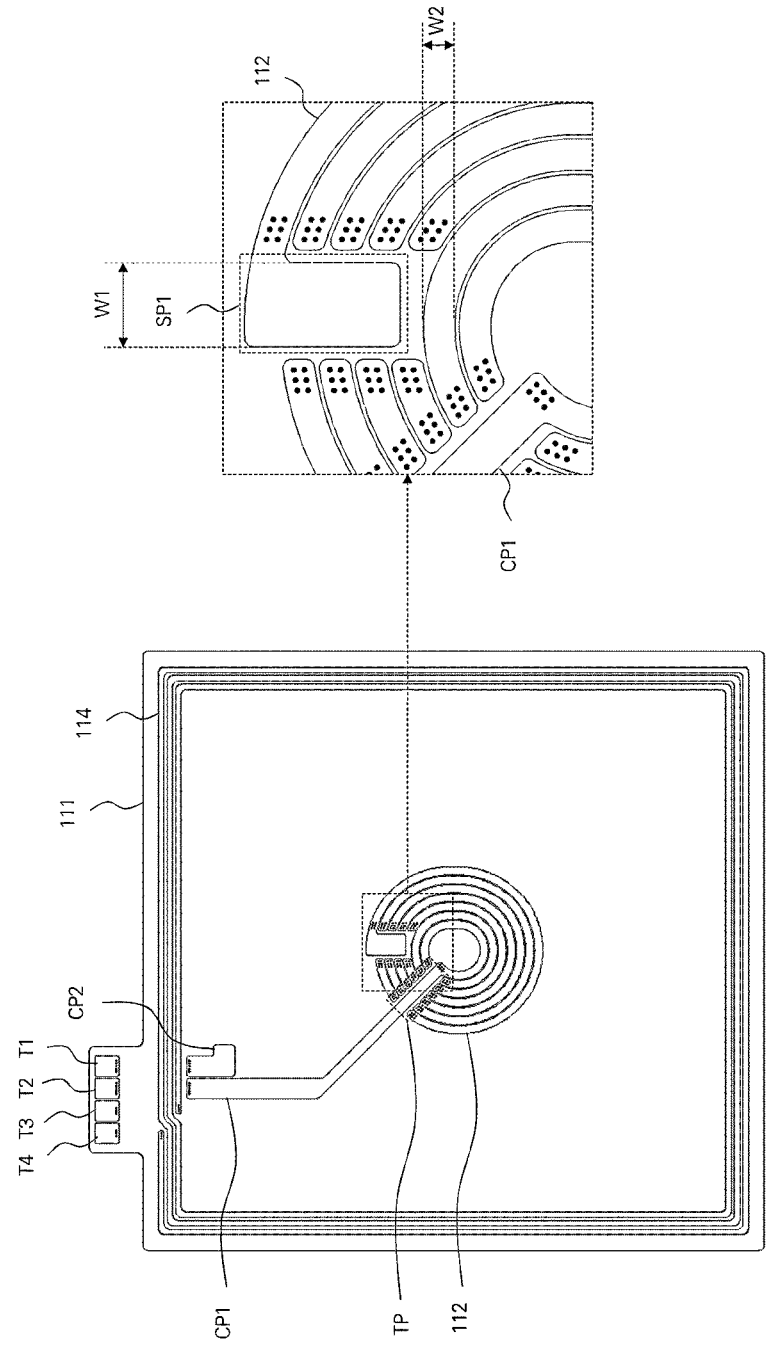
[Fig. 3]

[FIG. 4]
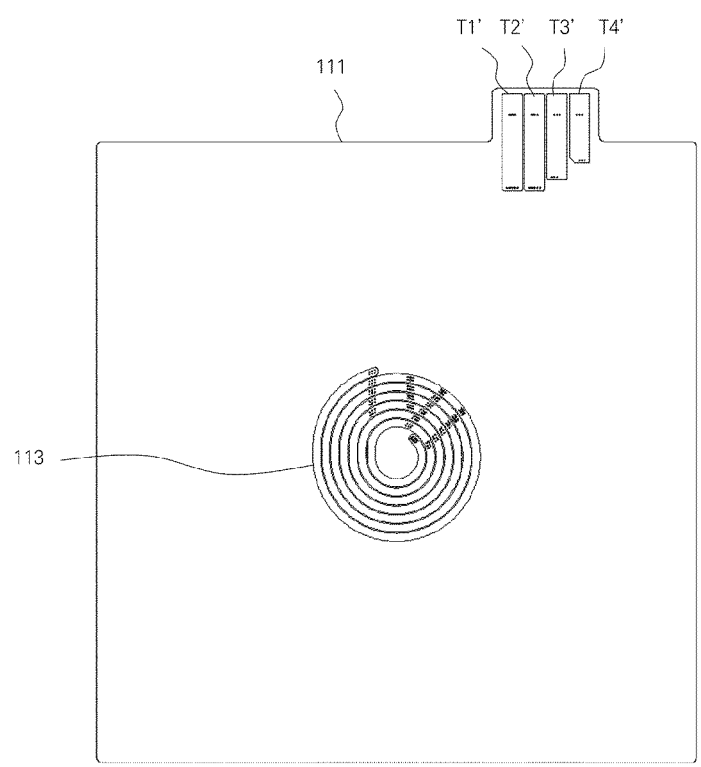

[FIG. 5]
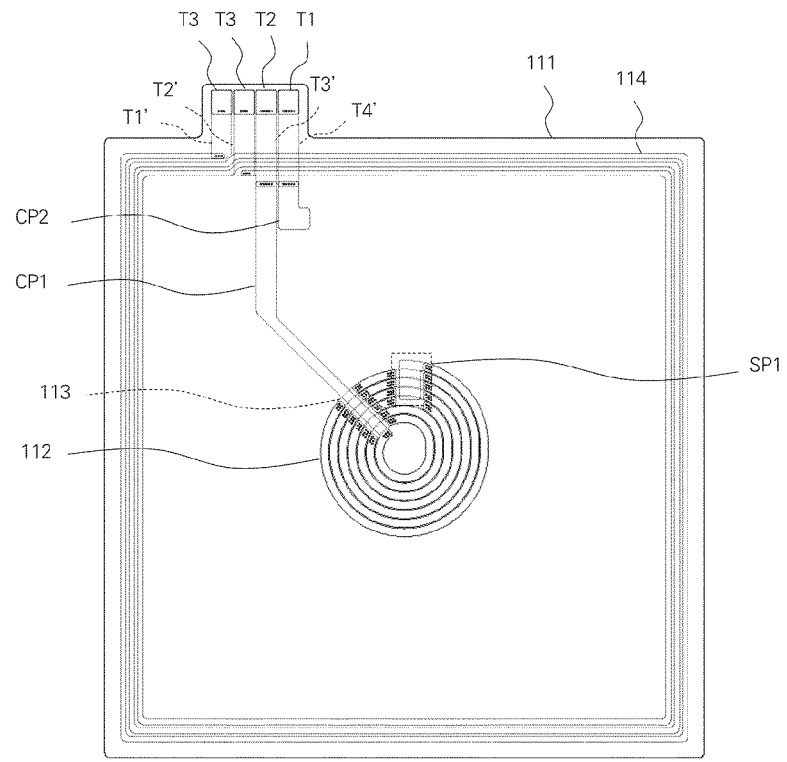
[FIG. 6]
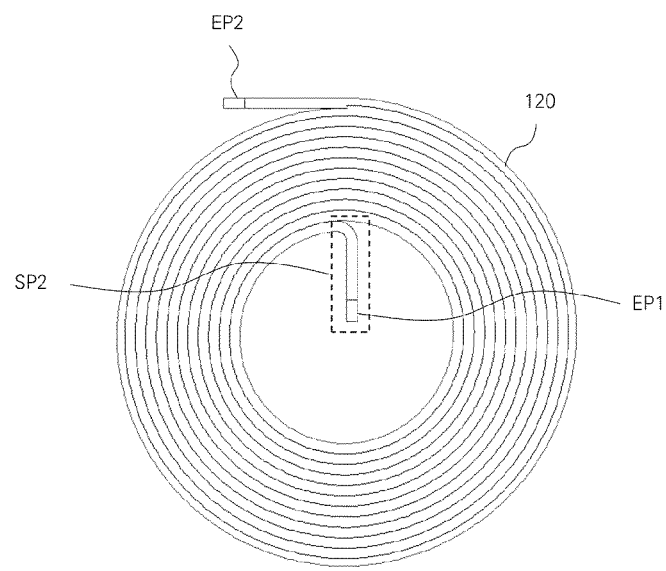

[Fig. 7]
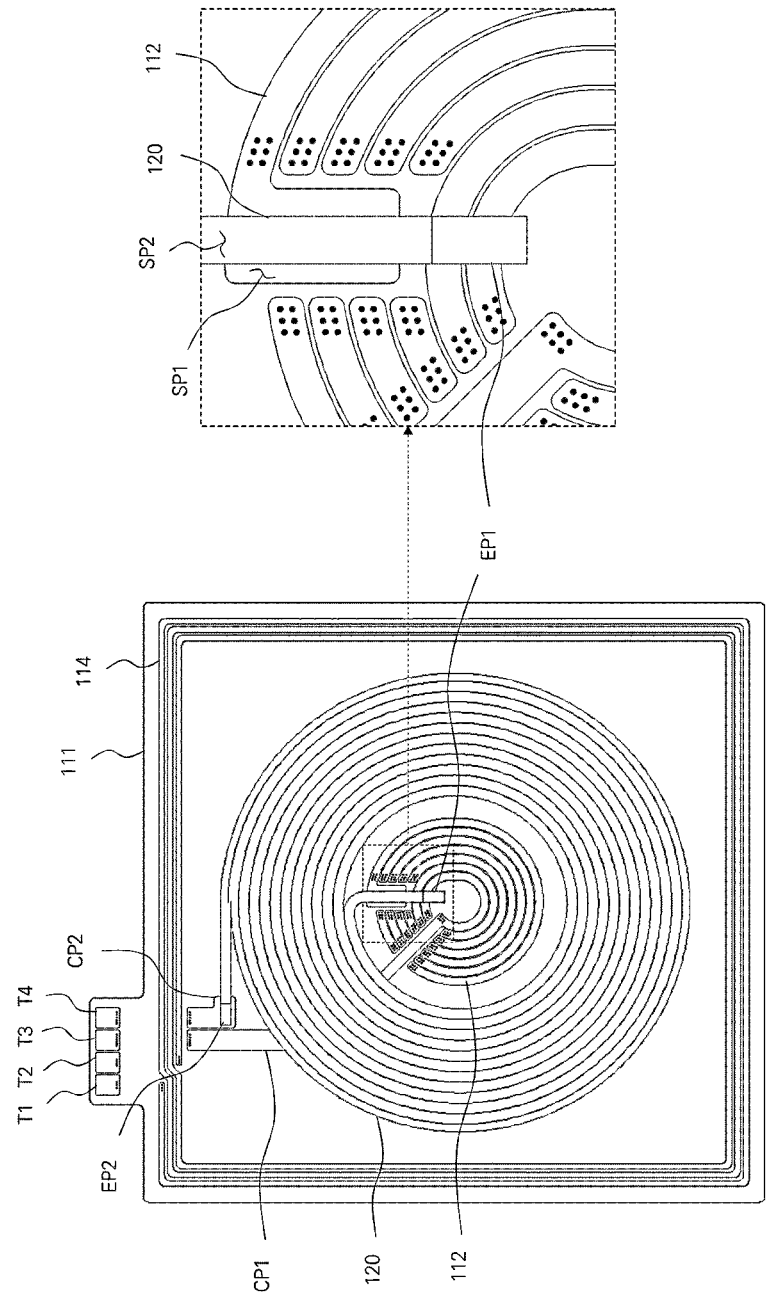

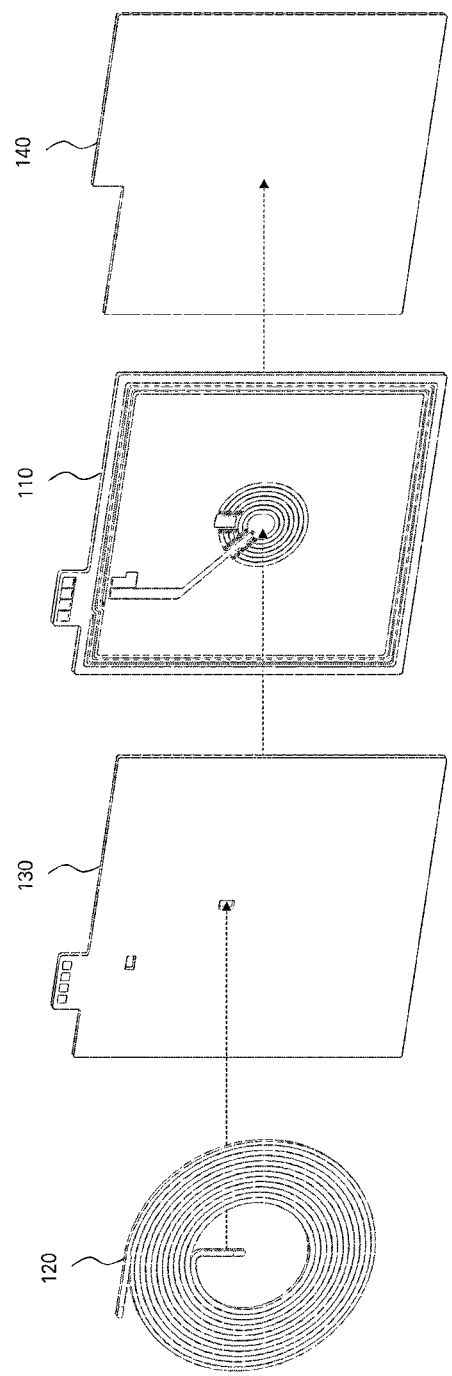
[Fig. 8]

[FIG. 9]
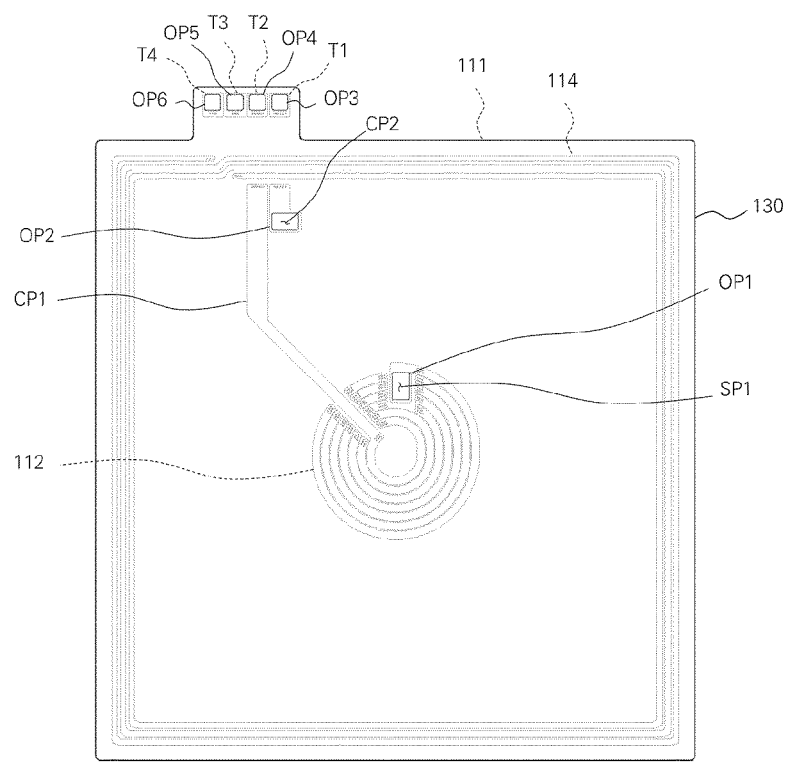

[FIG. 10]
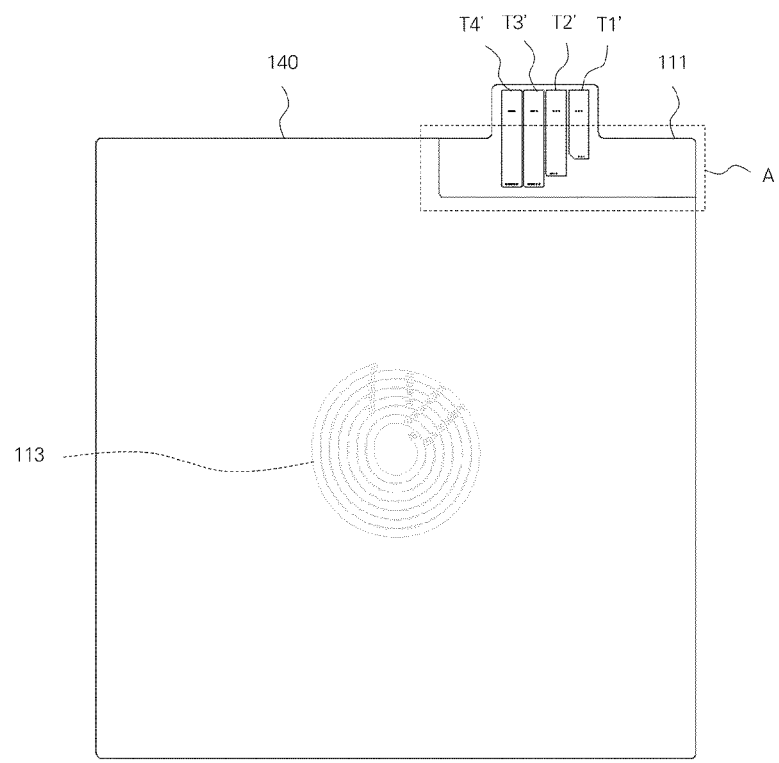

[FIG. 11]
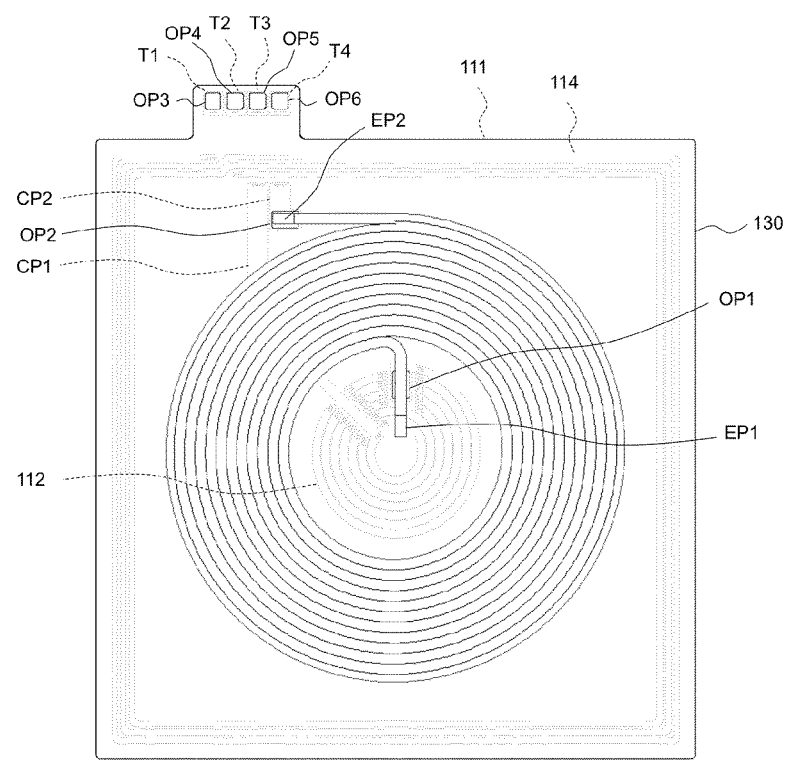

[Fig. 12]
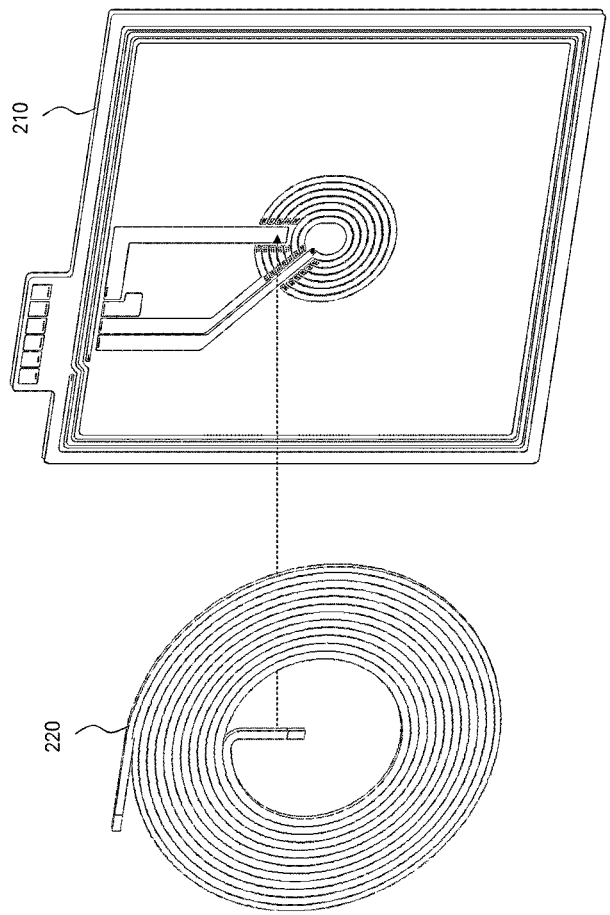

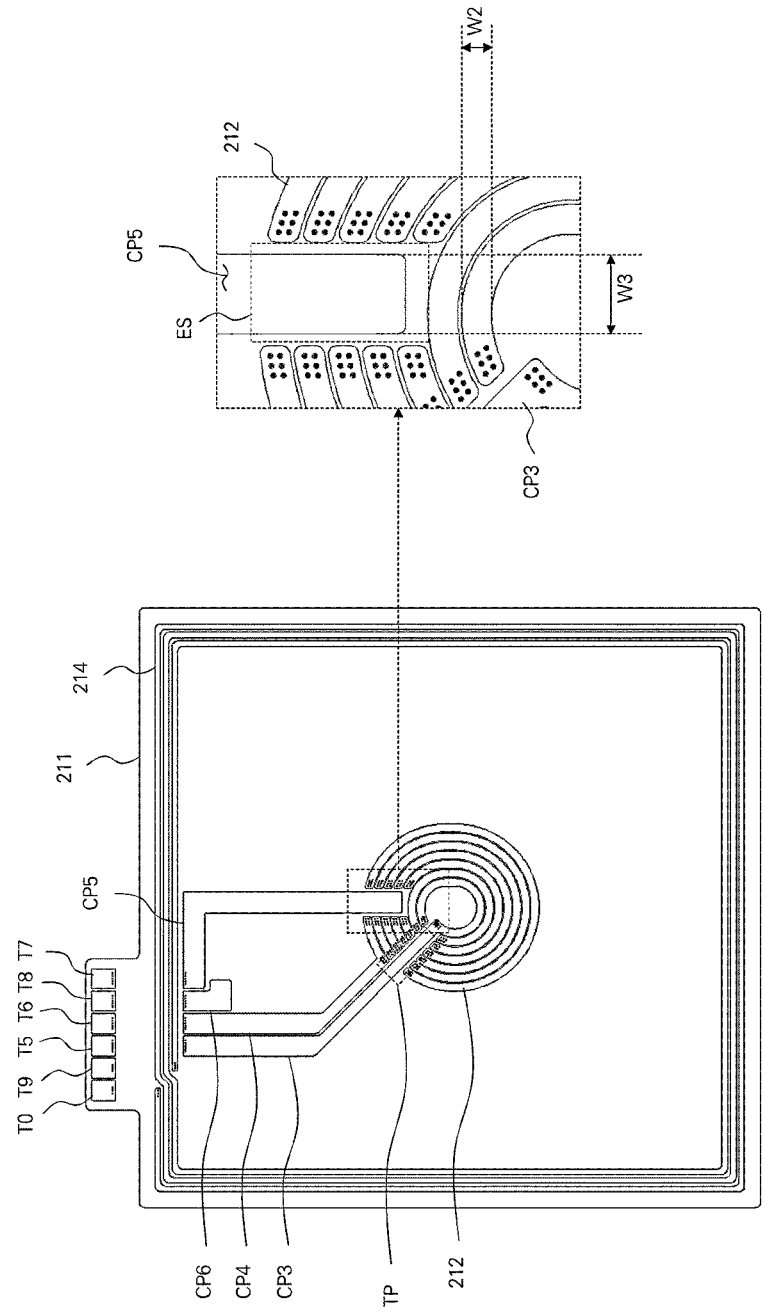
[Fig. 13]

[FIG. 14]
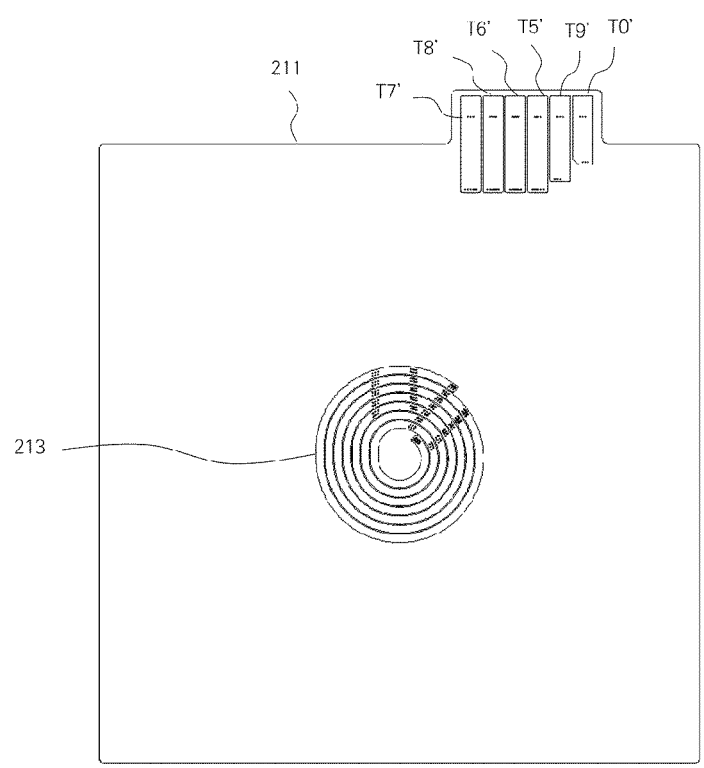

[FIG. 15]
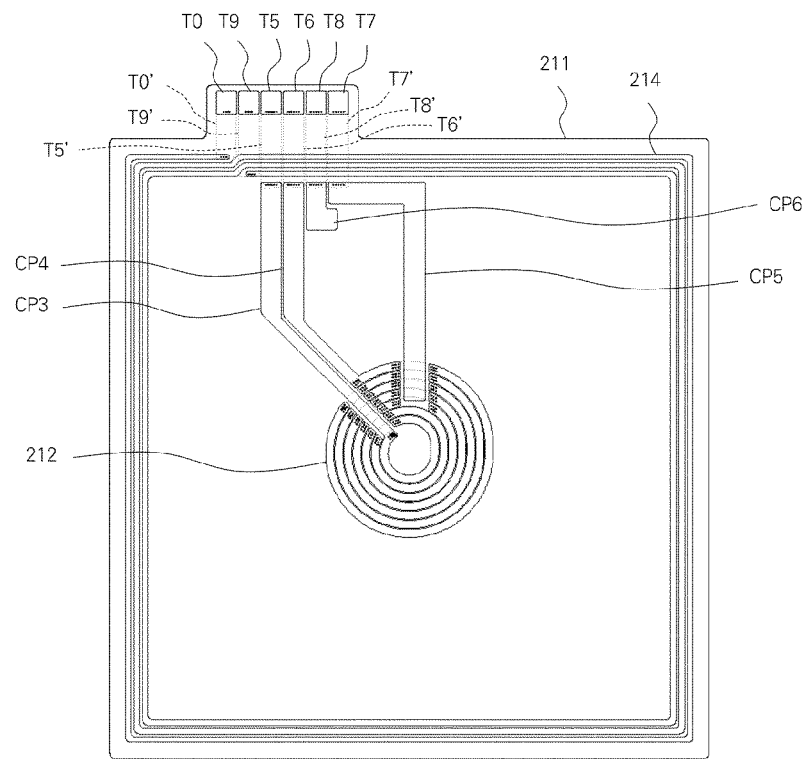
[FIG. 16]
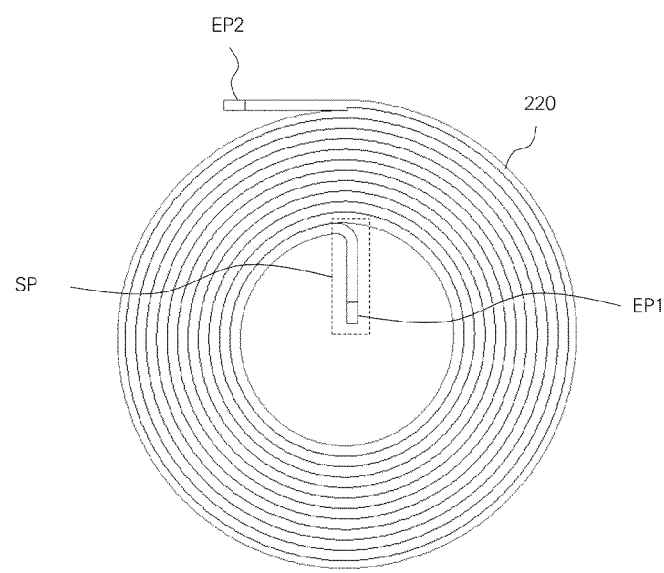

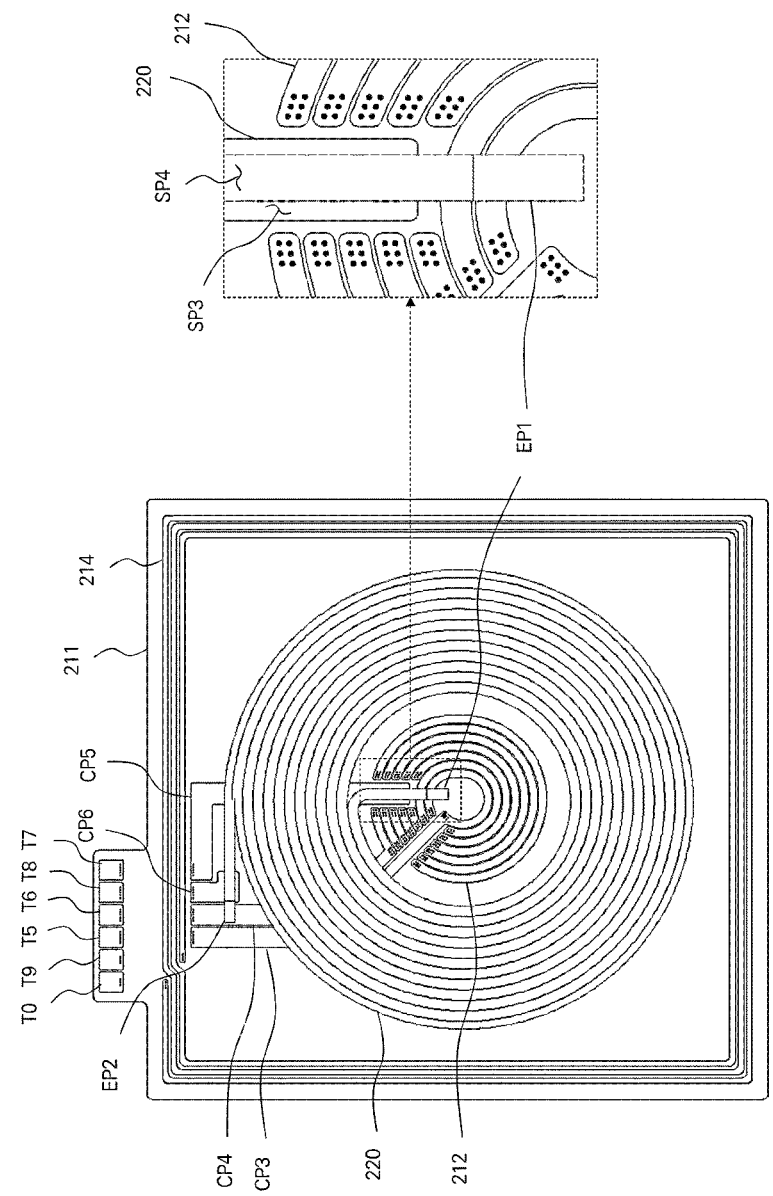
[Fig. 17]

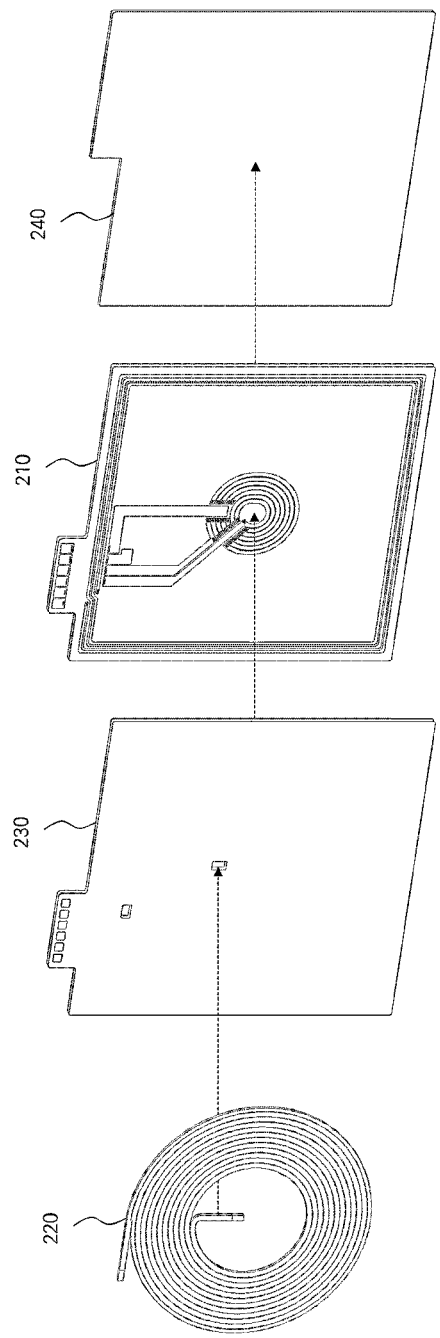
[Fig. 18]

[FIG. 19]
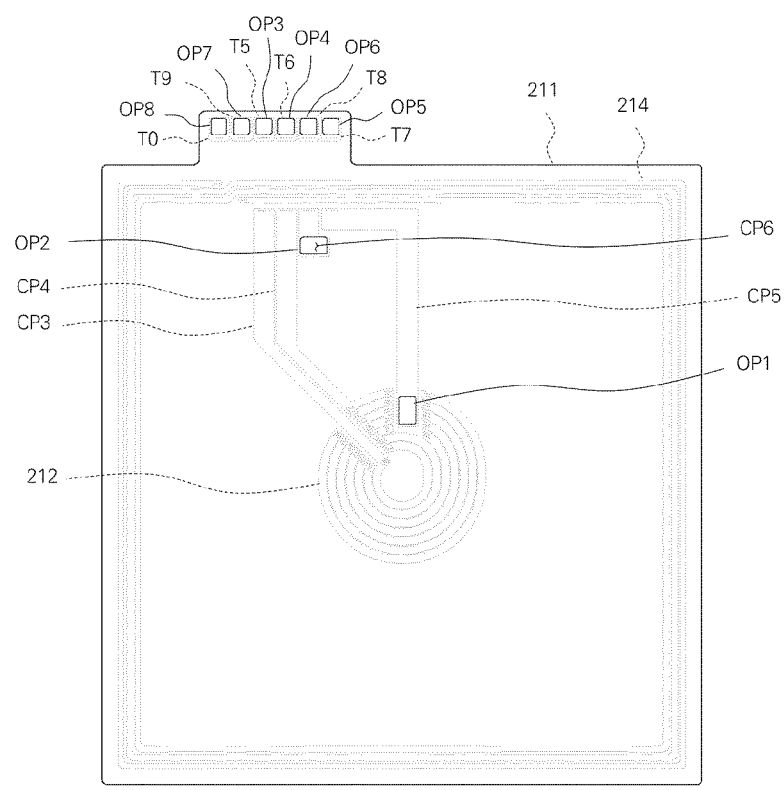

[FIG. 20]
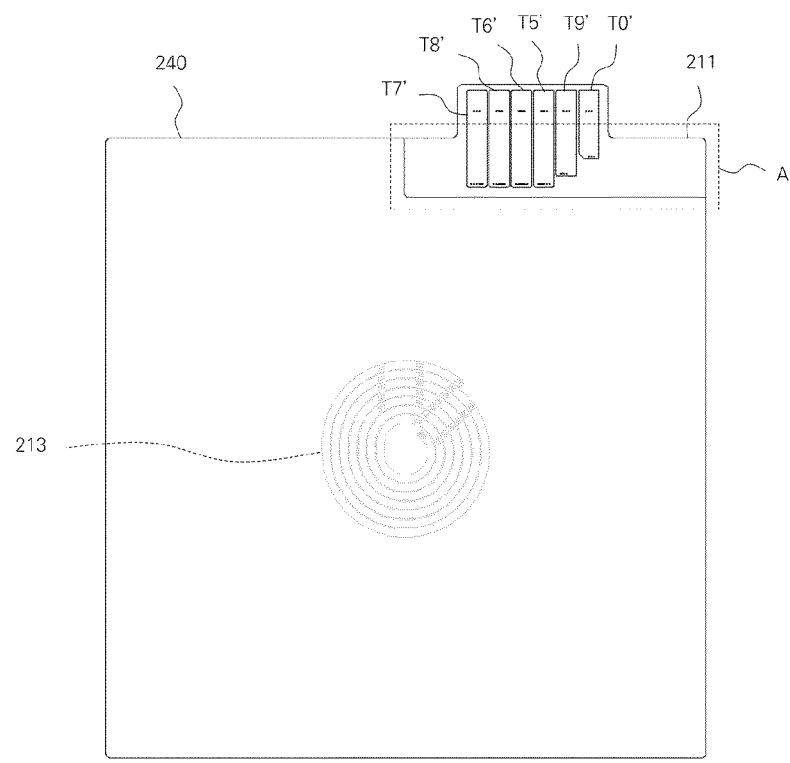

[FIG. 21]
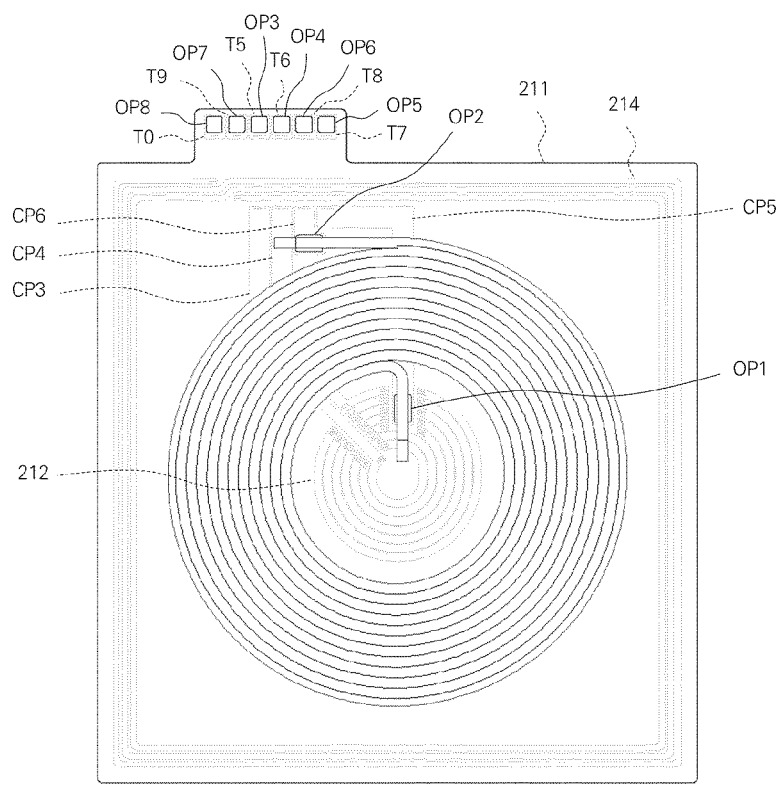

ANTENNA MODULE FOR WIRELESS POWER TRANSMISSION AND RECEPTION

TECHNICAL FIELD

The present disclosure relates to an antenna module for wireless power transmission and reception and, more particularly, to an antenna module for wireless power transmission and reception, the module capable of performing wireless power transmission and reception.

BACKGROUND ART

With the development of communication technology, a near field communication function and a wireless power reception (or wireless charging) function have been applied to a mobile terminal. That is, the mobile terminal transmits and receives data to and from a different electronic device using the short-distance (for example, NFC) communication function, and charges a built-in battery using the wireless power reception (or wireless charging) function.

In recent years, research has been conducted on application of the technology of charging a wearable device using the mobile terminal. Mobile terminals capable of charging a different mobile terminal, as well as the wearable device, have become available on the market.

Accordingly, research has been conducted on structures of various antennas in order for the mobile terminals not only to provide the wireless power reception and wireless power transmission functions, but also to improve the efficiency of charging the wearable device.

SUMMARY OF INVENTION

Technical Problem

An object of the present disclosure, which is proposed in view of the above-mentioned situation, is to provide an antenna module for wireless power transmission and reception capable of providing a fixed charging recognition ratio regardless of a position thereof by disposing an internal loop pattern on an inner circumferential region of an external loop coil.

Solution to Problem

In order to accomplish the above-mentioned object, according to an aspect of the present disclosure, there is provided an antenna module for wireless power transmission and reception, the module including: a base substrate; a first antenna having a first radiation pattern that is disposed on an upper surface of the base substrate and forms a first loop; and a second antenna stacked on the upper surface of the base substrate and having a coil that forms a second loop by being wound along an outer circumference of the first loop.

The antenna module may further include a first cover layer interposed between the first radiation pattern and the second antenna, and having0 an opening formed in a region overlapping the first connection electrode of the first radiation pattern.

The antenna module may further include a connection pattern having a greater line-width than a line-with of the first radiation pattern and the second antenna, and having a first end portion disposed in the accommodation space.

The antenna module may further include a first cover layer interposed between the first radiation pattern and the second antenna, and having an opening formed in a region overlapping the accommodation space.

Advantageous Effects

According to the present disclosure, in an antenna module for wireless power transmission and reception, an internal loop pattern is disposed in an inner circumferential region of an external loop coil. Thus, the effect of possibly providing a fixed charging recognition ratio over all regions of the antenna module for wireless power transmission and reception can be achieved.

Particularly, unlike in an antenna module for wireless power transmission and reception in the related art that has an empty space in the center portion, in the antenna module for wireless power transmission and reception according to the present disclosure, although a small-sized device is disposed in the center portion thereof, respective overlapping regions of an antenna of the small-sized device and the antenna module for wireless power transmission and reception are increased. Thus, the effect of possibly improving a charging recognition ratio can be achieved.

In addition, in the antenna module for wireless power transmission and reception, an end portion of the internal loop pattern extends toward a direction of the center point of a loop, and is disposed, as a connection electrode, inside the loop. Thus, the effect of possibly improving the charging recognition ratio of an antenna and coupling strength between the internal loop pattern and the external loop coil without increasing an area of the antenna can be achieved.

In addition, in the antenna module for wireless power transmission and reception, the connection electrode to which the external loop coil is formed in such a manner as to have a greater line-width than the external loop coil. Thus, the effect of possibly increasing respective overlapping regions of the internal loop pattern and the external loop coil and thus the coupling strength between the internal loop pattern and the external loop coil can be achieved.

In addition, in the antenna module for wireless power transmission and reception, an end portion of the external loop coil is disposed in an inner circumference region of the internal loop pattern, and the external loop coil and the internal loop pattern are connected by soldering in inner region rather than the end portion of the external loop coil. Thus, the effect of possibly increasing the coupling strength more than when the end portion of the external loop coil is connected to the internal loop pattern can be achieved.

In addition, in the antenna module for wireless power transmission and reception, the connection pattern to which the external loop coil is connected may be formed in such a manner as to have a greater line-width than the external loop coil. Thus, the effect of possibly improving the coupling strength between the internal loop pattern and the external loop coil can be achieved.

In addition, in the antenna module for wireless power transmission and reception, the connection pattern that is connected to the external loop coil is disposed in an accommodation space inside the internal loop pattern. Moreover, a region of the connection pattern that is disposed in the accommodation space, and the end portion of the external loop coil are connected to each other by soldering. Thus, the effect of possibly improving the charging recognition ratio of the antenna and the coupling strength between the internal loop pattern and the external loop coil without increasing the area of the antenna can be achieved.

In addition, in the antenna module for wireless power transmission and reception, the internal loop pattern is disposed on an inner circumference of the external loop coil, and the external loop coil and the internal loop pattern are made to operate as independent antennas, respectively. Thus, the fixed charging recognition ratio is ensured in all regions of the antenna module for wireless power transmission and reception. Moreover, unlike in an antenna module for wireless power transmission and reception in the related art that has an empty space in the center portion, although a small-sized device is disposed in the center portion of the antenna module for wireless power transmission and reception according to the present disclosure, respective overlapping regions of an antenna of the small-sized device and the antenna module for wireless power transmission and reception are increased. Thus, the effect of possibly improving the charging recognition ratio can be achieved.

BRIEF DESCRIPTION OF DRAWINGS

FIG. 1 is a view that is referred to for description of an antenna module for wireless power transmission and reception according to an embodiment of the present disclosure.

FIG. 2 is a view illustrating a configuration of an antenna module for wireless power transmission and reception according to a first embodiment of the present disclosure.

FIGS. 3 to 5 are views that are referred to for description of a first antenna in FIG. 2.

FIG. 6 is a view that is referred to for description of a second antenna in FIG. 2.

FIG. 7 is a view that is referred to for description of a structure in which the first antenna and the second antenna in FIG. 2 are stacked on top of each other.

FIGS. 8 to 11 are views illustrating a modification example of the antenna module for wireless power transmission and reception according to the first embodiment of the present disclosure.

FIG. 12 is a view illustrating a configuration of an antenna module for wireless power transmission and reception according to a second embodiment of the present disclosure.

FIGS. 13 to 15 are views that are referred to for description of a first antenna in FIG. 12.

FIG. 16 is a view that is referred to for description of a second antenna in FIG. 12.

FIG. 17 is a view that is referred to for description of a structure in which the first antenna and the second antenna in FIG. 12 are stacked on top of each other.

FIGS. 18 to 21 are views that are referred to for description of a modification example the antenna module for wireless power transmission and reception according to the second embodiment of the present disclosure.

DESCRIPTION OF EMBODIMENTS

The most preferred embodiment of the present disclosure will be described below with reference to the accompanying drawings in sufficient detail to enable a person of ordinary skill in the art to which the present disclosure pertains to practice the present disclosure without undue experimentation. It should be noted that the same constituent element, although illustrated in different drawings, is designated by the same reference numeral when a reference numeral is assigned to a constituent element in the drawings. In addition, a specific description of a well-known configuration or function that is associated with the present disclosure will be omitted when determined as making the nature and gist of the present disclosure obfuscated.

It should be noted that the same constituent element, although illustrated in different drawings, is designated by the same reference numeral when a reference numeral is assigned to a constituent element in the drawings.

In addition, a specific description of a well-known configuration or function that is associated with the present disclosure will be omitted when determined as making the nature and gist of the present disclosure obfuscated.

In addition, a constituent element, when described as being disposed or formed "on an upper surface" or "on a lower surface" of a different constituent element, should be interpreted as being brought into contact with the different constituent element. Moreover, a constituent element, when described as being disposed or formed "over/above an upper surface" or "under/below a lower surface" of a different constituent element, should be interpreted as being connected to the different constituent element with a third constituent element in between.

With reference to FIG. 1, an antenna module 100 and 200 for wireless power transmission and reception is an antenna that is mounted into an electronic apparatus 10 having a wireless power transmission (wireless charging) function. As an example, the electronic apparatus 10 into which the antenna module 100 or 200 for wireless power transmission and reception is mounted is a smartphone, a tablet PC, a notebook PC, or the like.

The antenna module 100 for wireless power transmission and reception is mounted into the electronic apparatus 10 and receives a wireless power from a charger and thus charges a battery for the electronic apparatus 10. Moreover, the antenna module 100 for wireless power transmission and reception transmits the wireless power to a charging-target device 20, such as a smartphone, a wireless earphone, and a small-sized wearable device, and thus charges a battery for the charging-target device 20.

Normally, the antenna that is mounted into the electric apparatus 10 is a wireless power reception antenna receiving the wireless power. The wireless power reception antenna is manufactured for the purpose of receiving the wireless power. Because of this, when transmitting the wireless power (that is, performing battery sharing charging), a charging recognition ratio of the charging-target device is reduced or wireless charging efficiency is reduced.

Accordingly, an object of the antenna modules 100 and 200 for wireless power transmission and reception according to first and second embodiments, respectively, of the present disclosure is to couple a coil-type antenna and a printed circuit substrate-type antenna to each other. An advantageous effect thereof is to not only increase a charging recognition ratio, but also improve wireless charging efficiency when transmitting a wireless power (that is, when performing wireless charging or battery sharing charging).

With reference to FIG. 2, the antenna module 100 for wireless power transmission and reception according to the first embodiment of the present disclosure is configured to include a first antenna 110 constituting an internal loop pattern and a second antenna 120 constituting an external loop coil.

The first antenna 110 and the second antenna 120 are coupled to each other (or are stacked on top of each other), and thus an antenna pattern of the first antenna 110 is disposed on a center portion (that is, an inner circumferential region) of the second antenna 120. Accordingly, the first antenna 110 constitutes the internal loop pattern of the antenna module 100 for wireless power transmission and reception, and the second antenna 120 constitutes the external loop coil of the antenna module 100 for wireless power transmission and reception.

Accordingly, the antenna module 100 for wireless power transmission and reception has an expanded area (or length) for transmitting and receiving the wireless power, and thus increases the charging recognition ratio of the charging-target device and the wireless charging efficiency.

With reference to FIGS. 3 to 5, the first antenna 110 is the printed circuit substrate-type antenna and is configured to include a base substrate 111, a first radiation pattern 112, and a second radiation pattern 113.

The base substrate 111 may be formed of a thin-film substrate, such as a film, a sheet, or a thin-film substrate. The base substrate 111 may be a flexible printed circuit substrate (FPCB). As an example, the base substrate 111 is a polypropylene (PP) sheet. The base substrate 111 is not limited to those that are mentioned above. Any substrate that is a thin-film substrate on which a coil pattern constituting an antenna is capable of being formed may be variously used as the base substrate 111.

The first radiation pattern 112 is disposed on an upper surface of the base substrate 111. The first radiation pattern 112 is formed in the shape of a loop in such a manner as to be wound multiple times around the center point of the base substrate 111 on the upper surface of the base substrate 111. In this case, the first radiation pattern 112 is configured with a plurality of radiation lines and forms a through-path TP through which a first connection pattern CP1 passes. The through-path here is a region that is formed by spacing the radiation lines away from each other. As an example, in a region where a first through-path TP is formed, the first radiation pattern 112 shares the second radiation pattern 113 disposed on a rear surface of the base substrate 111 through a via hole and forms a loop.

A first end portion of the first radiation pattern 112 is bent from an outermost part of the loop toward a direction of the inside of the loop. The first end portion of the first radiation pattern 112 is disposed inside the loop and forms a first connection electrode SP1. As an example, the direction of the inside of the loop is a direction of the center point of the loop formed by the first radiation pattern 112. The inside of the loop may be defined as a region located between the outermost part and the innermost part of the loop formed by the first radiation pattern 112.

As an example, with reference to FIG. 3, the first radiation pattern 112 is wound 7 times around a virtual winding axis perpendicular to the base substrate 111 at the center point of the base substrate 111, and forms a loop having 1 turn to 7 turn. The first end portion of the first radiation pattern 112 is bent toward the direction of the winding axis at the seventh turn that is the outermost part of the loop, and is disposed adjacent to the second turn of the loop. Accordingly, the first end portion of the first radiation pattern 112 is disposed inside the loop.

The first connection electrode SP1 is formed on the first end portion of the first radiation pattern 112. The first connection electrode SP1 means a portion of the first radiation pattern 112 bent at the outermost part of the loop to be disposed inside the loop. The first connection electrode SP1 is a region from the first end of the first radiation pattern 112 to a bent portion of the first radiation pattern 112, and is formed in a predetermined plate-shaped. In this case, the first connection electrode SP1 is formed in such a manner as to have a line-width W1 that is greater than a line-width W2 of the first radiation pattern 112. As an example, the first connection electrode SP1 is connected, by soldering, to one end portion of a coil constituting the second antenna 120. As an example, in a region where the first connection electrode SP1 is disposed, the first radiation pattern 112 shares the second radiation pattern 113 disposed on a rear surface of the base substrate 111 through the via-hole and forms the loop.

In this manner, in the antenna module 100 for wireless power transmission and reception according to the first embodiment of the present disclosure, the first end portion of the first radiation pattern 112 is bent from the outermost part of the first radiation pattern 112 toward the center point. As a result of this extension, the plate-shaped first connection electrode SP1 is formed in such a manner as to have a greater line-width than the first radiation pattern 112. Accordingly, the plate-shaped first connection electrode SP1 is disposed inside the loop formed by the first radiation pattern 112. Thus, a region that is brought into contact with or is coupled to the second antenna (coil) 120 may be increased, thereby increasing coupling strength between the first antenna 110 and the second antenna 120.

The second radiation pattern 113 is disposed on a lower surface of the base substrate 111. The second radiation pattern 113 is formed in the shape of a loop in such a manner as to be wound multiple times around the center point of the base substrate 111 on the lower surface of the base substrate 111.

The second radiation pattern 113 is disposed in such a manner as to overlap the first radiation pattern 112 with the base substrate 111 in between. The second radiation pattern 113 is connected to the first radiation pattern 112 through the via hole (or through-hole), and thus forms the internal loop pattern of the antenna module 100 for wireless power transmission and reception. In this case, the second radiation pattern 113 forms a detour route of the first radiation pattern 112 at a region that corresponds to the through-path TP and the first connection electrode SP1.

The first antenna 110 may further comprise a third radiation pattern 114 that is formed on the upper surface of the base substrate 111. The third radiation pattern 114 may be formed in the shape of loop in such a manner as to be wound along an outer circumference of the base substrate 111 on the upper surface of the base substrate 111. In this case, as an example, the third radiation pattern 114 is a radiator that resonates to a frequency band (for example, an NFC frequency band) for near field communication.

The first antenna 110 may further include a different radiation pattern that resonates to an MST frequency band. The third radiation pattern 114 of the first antenna 110 may be configured as a radiator that resonates to the MST frequency band.

The first antenna 110 may further include a plurality of terminal patterns for connecting the antenna module 100 for wireless power transmission and reception to a circuit substrate built into a mobile terminal.

The plurality of terminal patterns are disposed on the upper and lower surfaces of the base substrate 111 in a divided manner. Among the plurality of terminal patterns, a pair of terminal patterns is connected to one end portion of the internal loop pattern constituted by the first radiation pattern 112 and the second radiation pattern 113 and one end portion (that is, a second end portion EP2) of the second antenna 120 (that is, the external loop coil) disposed on the upper surface of the base substrate 111. Among the plurality of terminal patterns, the terminal patterns constituting the other pair are connected to both end portions, respectively, of the third radiation pattern 114.

As an example, with reference to FIGS. 3 to 5, the first antenna 110 includes terminal patterns T1 to T4 that are formed on the upper surface of the base substrate 111, and terminal patterns T1' to T4' that are formed on the lower surface of the base substrate 111.

The terminal T1 and T1' are disposed on the upper and lower surfaces, respectively, of the base substrate 111. All portions or one portion of the terminal pattern T1 is disposed in such a manner as to overlap the terminal pattern T1'. The terminal patterns T1 and T1' are connected to each other by the via hole at an overlapping region with the base board 111 interposed therebetween.

A first end portion of the terminal pattern T1' and a second end portion of the terminal pattern T1' are disposed in such a manner as to overlap the terminal pattern T1 and a second connection pattern CP2 disposed on the upper surface of the base substrate 111, respectively. The terminal pattern T1' and the second connection pattern CP2 are connected to each other by the via hole at an overlapping region with the base board 111 interposed therebetween.

The terminal patterns T2 and T2' are disposed on the upper and lower surfaces, respectively, of the base substrate 111. All portions or one portion of the terminal pattern T2 is disposed in such a manner as to overlap the terminal pattern T2'. The terminal patterns T2 and T2' are connected to each other by the via hole at an overlapping region with the base board 111 interposed therebetween.

A first end portion of the terminal pattern T2' and a second end portion of the terminal pattern T2' are disposed in such a manner as to overlap the terminal pattern T2 and the first connection pattern CP1 disposed on the upper surface of the base substrate 111, respectively. The terminal pattern T2' and the first connection pattern CP1 are connected to each other by the via hole at an overlapping region with the base board 111 interposed therebetween.

The terminal patterns T1 and T1' are connected to a second end portion EP2 of the second antenna 120, and the terminal patterns T2 and T2' are connected to a second end portion of the first radiation pattern 112. In this case, a first end portion EP1 of the second antenna 120 is connected to the first end portion (that is, the first connection electrode SP1) of the first radiation pattern 112.

Accordingly, the terminal patterns T1 and T1' operate as terminals that connect the antenna module 100 for wireless power transmission and reception, which the internal loop pattern (that is, the first radiation pattern 112 and the second radiation pattern 113) and the external loop coil (the coil of the second antenna 120) constitute, to an external circuit.

The terminal patterns T3 and T3' are disposed on the upper and lower surfaces, respectively, of the base substrate 111. All portions or one portion of the terminal pattern T3 is disposed in such a manner as to overlap the terminal pattern T3'. The terminal patterns T3 and T3' are connected to each other by the via hole at an overlapping regions with the base substrate 111 interposed therebetween.

A first end portion of the terminal pattern T3' and a second end portion of the terminal pattern T3' are disposed in such a manner as to overlap the terminal pattern T3 and a first end portion of the third radiation pattern 114 disposed on the upper surface of the base substrate 111, respectively. The terminal pattern T3' and the third radiation pattern 114 are connected to each other by the via hole at an overlapping regions with the base substrate 111 interposed therebetween. In this case, as an example, the first end portion of the third radiation pattern 114 is an end portion that is disposed at the innermost part of the loop formed by the third radiation pattern 114.

The terminal patterns T4 and T4' are disposed on the upper and lower surfaces, respectively, of the base substrate 111. All portions or one portion of the terminal pattern T4 is disposed in such a manner as to overlap the terminal pattern T4'. The terminal patterns T4 and T4' are connected to each other by the via hole at an overlapping regions with the base substrate 111 interposed therebetween.

A first end portion of the terminal pattern T4' and a second end portion of the terminal pattern T4' are disposed in such a manner as to overlap the terminal pattern T4 and a second end portion of the third radiation pattern 114 disposed on the upper surface of the base substrate 111, respectively. The terminal pattern T2' and the third radiation pattern 114 are connected to each other by the via hole at an overlapping regions with the base substrate 111 interpose therebetween. In this case, as an example, the second end portion of the third radiation pattern 114 is an end portion that is disposed at the outermost part of the loop into which the third radiation pattern 114 is formed.

In this manner, the terminal patterns T3 and T3' are connected to the first end portion of the third radiation pattern 114, and the terminal patterns T4 and T4' are connected to the second end portion of the third radiation pattern 114. Accordingly, the terminal patterns T3 and T3', and T4, and T4' operate as terminals that connect a near field communication antenna, which the third radiation pattern 114 constitutes, to an external circuit.

The second antenna 120 is the external loop coil of the antenna module 100 for wireless power transmission and reception, and is configured as the coil-type antenna that is stacked on an upper surface of the first antenna 110 (that is, the base substrate 111). In this case, both end portions of the second antenna 120 are connected, by soldering or the like, to the internal loop pattern and the second connection pattern CP2, respectively, of the first antenna 110.

With reference to FIG. 6, the second antenna 120 is configured with a loop-type coil that is wound multiple times around a virtual winding axis. The first end portion EP1 of the second antenna 120 extends from the innermost part of the loop toward the direction of the virtual winding axis and is disposed at the center point of the loop. The first end portion EP1 of the second antenna 120 may be disposed adjacent to the center point of the loop.

The first end portion EP1 of the second antenna 120 is disposed on an inner circumference of the loop into which the coil is formed, and forms a second connection electrode SP2 that is disposed in such a manner as to overlap the first connection electrode SP1 of the first antenna 110. The second end portion EP2 of the second antenna 120 is disposed on the outermost part of the loop into which the coil is formed, and is disposed in such a manner as to overlap the second connection pattern CP2 of the first antenna 110.

With reference to FIG. 7, the second antenna 120 is disposed on an upper surface of the first antenna 110. The second connection electrode SP2 that includes the first end portion EP1 of the second antenna 120 is stacked on top of the first connection electrode SP1 of the first radiation pattern 112, and is connected, by soldering or the like, to the first connection electrode SP1.

In this case, the first end portion EP1 of the second antenna 120 is disposed adjacent to the center point of the first radiation pattern 112 (that is, the center point of the base substrate 111), and is disposed inward more than the innermost pattern of the loop into which the first radiation pattern 112 is formed. In other words, the first end portion EP1 of the second antenna 120 is disposed in an inner circumference region of the loop into which the internal loop pattern is formed.

Accordingly, the first end portion EP1 of the second antenna 120 does not overlap the first connection electrode SP1, and one portion of the second connection electrode SP2 overlaps the first connection electrode SP1. The second antenna 120 is connected, by soldering or the like, to the first connection electrode SP1 at its region that overlaps the first connection electrode SP1.

In this manner, in the antenna module 100 for wireless power transmission and reception according to the first embodiment of the present disclosure, the first end portion EP1 of the second antenna 120 extends toward the direction of the center point of the internal loop pattern (that is, the first radiation pattern 112) and is disposed in an inner circumference region of the internal loop pattern. Moreover, the second antenna 120 is connected, by soldering or the like, at its region (that is, the second connection electrode SP2) that overlaps the first connection electrode SP1 of the first radiation pattern 112. Thus, the coupling strength between the first antenna 110 and the second antenna 120 may be increased.

In other words, in the antenna module 100 for wireless power transmission and reception according to the first embodiment of the present disclosure, the internal loop pattern (that is, the first connection electrode SP1 of the first radiation pattern 112) is connected to the second antenna 120 by soldering in inner region rather than the first end portion EP1 of the second antenna 120. Thus, the coupling strength between the first antenna 110 and the second antenna 120 is increased more than when the first end portion EP1 of the second antenna 120 is connected to the internal loop pattern.

The second end portion EP2 of the second antenna 120 is connected, by soldering or the like, to the second connection pattern CP2. The second end portion EP2 of the second antenna 120 is disposed in such a manner as to extend from the outermost part of the loop into which the coil is formed toward the direction of a second end portion of the second connection pattern CP2. The second end portion EP2 of the second antenna 120 is disposed in such a manner as to overlap the second connection pattern CP2, and is connected, by soldering or the like, to the second connection pattern CP2.

In order to increase the coupling strength between the first antenna 110 and the second antenna 120, the second antenna 120 may be disposed in such a manner that a portion thereof that is positioned inward more than the second end portion overlaps the second connection pattern CP2, and may be connected, by soldering or the like, to the second connection pattern CP2. In this case, if the second end portion EP2 of the second antenna 120 overlaps the first connection pattern CP1, a change may occur in antenna characteristic. Therefore, the second end portion EP2 of the second antenna 120 is disposed in such a manner as not to overlap the first connection pattern CP1.

With reference to FIGS. 8 to 10, the antenna module 100 for wireless power transmission and reception may further include a first cover layer 130 and a second cover layer 140.

The first cover layer 130 is disposed on the upper surface of the first antenna 110. The first cover layer 130 is interposed between the upper surface of the first antenna 110 and the second antenna 120 and insulates patterns of the first antenna 110 from the second antenna 120.

A plurality of openings are formed in the first cover layer 130. That is, the plurality of openings are formed for connecting the first antenna 110 and the second antenna 120 to each other, connecting the second antenna 120 and the second connection pattern CP2 to each other, and exposing the terminal pattern.

As an example, the first cover layer 130 includes a first opening OP1 to a sixth opening OP6.

The first opening OP1 is a hole for connecting the first antenna 110 and the second antenna 120, and is formed at a position that overlaps the first connection electrode SP1 of the first antenna 110. Through the first opening OP1, at least one portion of the first connection electrode SP1 of the first antenna 110 is exposed in order to connect the first end portion EP1 of the second antenna 120 and the first antenna 110 to each other.

The second opening OP2 is a hole for connecting the second antenna 120 and the second connection pattern CP2 to each other, and is formed at a position that overlaps the second connection pattern CP2 of the first antenna 110. Through the second opening OP2, at least one portion of the second connection pattern CP2 is exposed in order to connect the second end portion EP2 of the second antenna 120 and the second connection pattern CP2 of the first antenna 110 to each other.

The third opening OP3 to the sixth opening OP6 are holes for connecting the antenna module 100 for wireless power transmission and reception to an external circuit substrate, and is formed at positions, respectively, that overlap grounding patterns T1 to T4. The third opening OP3 is formed at a position that overlaps a first terminal pattern, and at least one portion of the first terminal pattern is exposed through the third opening OP3. The fourth opening OP4 is formed at a position that overlaps a second terminal pattern, and at least one portion of the second terminal pattern is exposed through the fourth opening OP4. The fifth opening OP5 is formed at a position that overlaps a third terminal pattern, and at least one portion of the third terminal pattern is exposed through the fifth opening OP5. The sixth opening OP6 is formed at a position that overlaps a fourth terminal pattern, and at least one portion of the fourth terminal pattern is exposed through the sixth opening OP6.

The second cover layer 140 is disposed on a lower surface of the first antenna 110. Through the second cover layer 140, the terminal patterns T1' to T4' are exposed that are disposed on the lower surface of the first antenna 110. That is, a stepped portion A is formed between adjacent two sides, among four sides of the second cover layer 140. The terminal patterns T1' to T4' are exposed through the stepped portion A formed in the second cover layer 140.

With reference to FIG. 11, the second antenna 120 is disposed on an upper surface of the first cover layer 130. The first end portion EP1 of the second antenna 120 is connected to the first connection electrode SP1 of the first radiation pattern 112 that is exposed through the first opening OP1. The second end portion EP2 of the second antenna 120 is connected to the second connection pattern CP2 that is exposed through the second opening OP2.

Accordingly, the antenna module 100 for wireless power transmission and reception includes a wireless power transmission and reception pattern that has the external loop coil in the shape of a loop that is configured with the second antenna 120 and the internal loop pattern in the shape of a loop that is configured with the first radiation pattern 112 and the second radiation pattern 113.

In this case, the internal loop pattern is disposed in an inner circumferential region of the external loop coil. One end portion (that is, the first connection electrode SP1 of the first radiation pattern 112) of the internal loop pattern is connected to one end portion (that is, the first end portion EP1 of the second antenna 120) of the external loop coil. The other end portion (the other end portion of the first radiation pattern 112) of the internal loop pattern is connected to the first connection pattern CP1, and the other end portion (that is, the second end portion EP2 of the second antenna 120)

of the external loop coil is connected to the second connection pattern CP2. Accordingly, the first antenna 110 and the second antenna 120 operate as one antenna that transmits and receives the wireless power.

As described above, in the antenna module 100 for wireless power transmission and reception according to the first embodiment of the present disclosure, the internal loop pattern is disposed in the inner circumferential region of the external loop coil. Thus, a fixed charging recognition ratio can be provided over entire regions of the antenna module 100. Particularly, unlike in an antenna module 100 for wireless power transmission and reception in the related art that has an empty space in the center portion, in the antenna module 100 for wireless power transmission and reception according to the first embodiment of the present disclosure, although a small-sized device is disposed in the center portion thereof, respective overlapping regions of an antenna of the small-sized device and the antenna module 100 for wireless power transmission and reception are increased. Thus, the charging recognition ratio can be improved.

With reference to FIG. 12, the antenna module 200 for wireless power transmission and reception according to the second embodiment of the present disclosure is configured to include a first antenna 210 that constitutes the internal loop pattern, and a second antenna 220 that constitutes the external loop coil. A difference of the second embodiment from the first embodiment is that the first antenna 210 and the second antenna 220 each constitute an independent radiator.

With reference to FIGS. 13 to 15, the first antenna 210 is the printed circuit substrate-type antenna and is configured to include a base substrate 211, a first radiation pattern 212, and a second radiation pattern 213.

The base substrate 211 may be formed of a thin-firm substrate, such as a film, a sheet, or a thin-film substrate. The base substrate 211 may be a flexible printed circuit substrate (FPCB). As an example, the base substrate 211 is a polypropylene (PP) sheet. The base substrate 211 is not limited to those that are mentioned above. Any substrate that is a thin-film substrate on which a coil pattern constituting an antenna is capable of being formed may be variously used as the base substrate 211.

The first radiation pattern 212 is disposed on an upper surface of the base substrate 211. The first radiation pattern 212 is formed in the shape of a loop in such a manner as to be wound multiple times around the center point of the base substrate 211 on the upper surface of the base substrate 211.

In this case, the first radiation pattern 212 is configured with a plurality of radiation lines. The plurality of radiation lines constitute a through-path TP through which a first connection pattern CP3 passes, and an accommodation space ES in which one portion of a fourth connection pattern CP4 is accommodated.

The through-path TP is a region that is formed by spacing the radiation lines away from each other, and is formed in a manner that passes through the loop into which the first radiation pattern 212 is formed. The accommodation space ES is a region that is formed by spacing the radiation lines away from each other, and is formed in a manner that leans toward an outer circumferential region without passing through the loop into which the first radiation pattern 212 is formed.

As an example, in a region wherein the through-path TP and the accommodation space ES are formed, the first radiation pattern 212 shares (bypasses) the second radiation pattern 213 disposed on a rear surface of the base substrate 211 through a via hole and forms the loop.

As an example, with reference to FIG. 13, the first radiation pattern 212 forms a loop having 7 circles from a first circle to a seventh circle, by being wound 7 times around a virtual winding axis perpendicular to the base substrate 211 at the center point of the base substrate 211. In this case, the through-path TP is formed in a manner that passes through all the first to seventh circles, and the accommodation space ES is formed over the third to seventh circles.

The second radiation pattern 213 is disposed on a lower surface of the base substrate 211. The second radiation pattern 213 is formed in the shape of a loop in such a manner as to be wound multiple times around the center point of the base substrate 211 at the lower surface of the base substrate 211.

The second radiation pattern 213 is disposed in such a manner as to overlap the first radiation pattern 212 with the base substrate 211 in between. The second radiation pattern 213 is connected to the first radiation pattern 212 through the via hole (or through-hole), and thus forms the internal loop pattern of the antenna module 200 for wireless power transmission and reception. In this case, the second radiation pattern 213 is connected to the first radiation pattern 212 through the via hole at a region that corresponds to the through-path TP and the accommodation space ES that are formed in the first radiation pattern 212, and forms a path around the first radiation pattern 212.

The first antenna 210 may further include a third radiation pattern 214 that is formed on the upper surface of the base substrate 211. The third radiation pattern 214 may be formed in the shape of a loop in such a manner as to be wound along an outer circumference of the base substrate 211 at the upper surface of the base substrate 211. In this case, as an example, the third radiation pattern 214 is a radiator that resonates to the frequency band (for example, the NFC frequency band) for near field communication.

The first antenna 210 may further include a different radiation pattern that resonates to the MST frequency band. The third radiation pattern 214 of the first antenna 210 may be configured as a radiator that resonates to the MST frequency band.

The first antenna 210 may further include a plurality of terminal patterns for connecting the antenna module 200 for wireless power transmission and reception to the circuit substrate built into the mobile terminal.

The plurality of terminal patterns are disposed on the upper and lower surfaces of the base substrate 211 in a divided manner. Among the plurality of terminal patterns, terminal patterns constituting one pair are connected to both end portions, respectively, of the internal loop pattern that the first radiation pattern 212 and the second radiation pattern 213 constitute. Among the plurality of terminal patterns, terminal patterns constituting another pair are connected to both end portions, respectively, of the third radiation pattern 214. Among the plurality of terminal patterns, terminal patterns constituting still another pair are connected to both end portions, respectively, of the second antenna 220 (that is, the external loop coil) that is disposed on the upper surface of the base substrate 211.

As an example, with reference to FIGS. 13 to 15, the first antenna 210 includes terminal patterns T5 to T0 formed on the upper surface of the base substrate 211, and terminal patterns T5' to T0' that are formed on the lower surface of the base substrate 211.

The terminal patterns T5 and T5' are disposed on the upper and lower surfaces, respectively, of the base substrate 211. All portions or one portion of the terminal pattern T5 is disposed in such a manner as to overlap the terminal pattern T5'. The terminal patterns T5 and T5' are connected to each other at their respective overlapping regions through the via hole with the base substrate 211 in between.

A first end portion of the terminal pattern T5' and a second end portion of the terminal pattern T5' are disposed in such a manner as to overlap the terminal patter T5 and a third connection pattern CP3 disposed on the upper surface of the base substrate 211, respectively. The terminal pattern T5' and the third connection pattern CP3 are connected to each other at their respective regions through the via hole with the base substrate 211 in between.

The terminal patterns T6 and T6' are disposed on the upper and lower surfaces, respectively, of the base substrate 211. All portions or one portion of the terminal pattern T6 is disposed in such a manner as to overlap the terminal pattern T6'. The terminal patterns T6 and T6' are connected to each other at their respective overlapping regions through the via hole with the base substrate 211 in between.

A first end portion of the terminal pattern T6' and a second end portion of the terminal pattern T6' are disposed in such a manner as to overlap the terminal pattern T6 and the fourth connection pattern CP4 disposed on the upper surface of the base substrate 211, respectively. The terminal pattern T6' and the fourth connection pattern CP4 are connected to each other at their respective regions through the via hole with the base substrate 211 in between.

Accordingly, the terminal patterns T5 and T5', and T6 and T6' operate as terminals that connect the internal loop pattern (the internal loop pattern that the first radiation pattern 212 and the second radiation pattern 213 constitute) to an external circuit.

The terminal patterns T7 and T7' are disposed on the upper and lower surfaces, respectively, of the base substrate 211. All portions or one portion of the terminal pattern T7 is disposed in such a manner as to overlap the terminal pattern T7'. The terminal patterns T7 and T7' are connected to each other at their respective overlapping regions through the via hole with the base substrate 211 in between.

A first end portion of the terminal pattern T7' and a second end portion of the terminal pattern T7' are disposed in such a manner as to overlap the terminal patter T7 and a fifth connection pattern CP5 disposed on the upper surface of the base substrate 211, respectively. The terminal pattern T7' and the fifth connection pattern CP5 are connected to each other at their respective regions through the via hole with the base substrate 211 in between.

The terminal T8 and T8' are disposed on the upper and lower surfaces, respectively, of the base substrate 211. All portions or one portion of the terminal pattern T8 is disposed in such a manner as to overlap the terminal pattern T8'. The terminal patterns T8 and T8' are connected to each other at their respective overlapping regions through the via hole with the base substrate 211 in between.

A first end portion of the terminal pattern T8' and a second end portion of the terminal pattern T8' are disposed in such a manner as to overlap the terminal pattern T8 and a sixth connection pattern CP6 disposed on the upper surface of the base substrate 211, respectively. The terminal pattern T8' and the sixth connection pattern CP6 are connected to each other at their respective regions through the via hole with the base substrate 211 in between.

In this manner, the terminal patterns T7 and T7', and T8 and T8' are connected to the fifth connection pattern CP5 and the sixth connection pattern CP6, respectively, which are connected to both end portions, respectively, of the external loop coil (that is, the second antenna 220, and thus operate as terminals that connect the external loop coil (that is, the second antenna 220) to an external circuit.

The terminal pattern T9 and T9' are disposed on the upper and lower surfaces, respectively, of the base substrate 211. All portions or one portion of the terminal pattern T9 is disposed in such a manner as to overlap the terminal pattern T9'. The terminal patterns T9 and T9' are connected to each other at their respective overlapping regions through the via hole with the base substrate 211 in between.

A first end portion of the terminal pattern T9' and a second end portion of the terminal pattern T9' are disposed in such a manner as to overlap the terminal pattern T9 and a first end portion of the third radiation pattern 214 disposed on the upper surface of the base substrate 211, respectively. The terminal pattern T9' and the third radiation pattern 214 are connected to each other at their respective overlapping regions through the via hole with the base substrate 211 in between.

The terminal patterns T0 and T0' are disposed on the upper and lower surfaces, respectively, of the base substrate 211. All portions or one portion of the terminal pattern T0 is disposed in such a manner as to overlap the terminal pattern T0'. The terminal patterns T0 and T0' are connected to each other at their respective overlapping regions through the via hole with the base substrate 211 in between.

A first end portion of the terminal pattern T0' and a second end portion of the terminal pattern T0' are disposed in such a manner as to overlap the terminal pattern TO and a second end portion of the third radiation pattern 214 disposed on the upper surface of the base substrate 211, respectively. The terminal pattern T0' and the third radiation pattern 214 are connected to each other at their respective overlapping regions through the via hole with the base substrate 211 in between.

In this manner, the terminal patterns T9 and T9', and T0 and T0' are connected to both end portions, respectively, of the third radiation pattern 214 and operate as terminals that connect the third radiation pattern 214 to an external circuit.

The first antenna 210 further includes the third connection pattern CP3 and the fourth connection pattern CP4 for connecting the terminal pattern and the internal loop pattern (that is, the first radiation pattern 212 and the second radiation pattern 213), and the fifth connection pattern CP5 and the sixth connection pattern CP6 for connecting the terminal pattern and the external loop coil (that is, the second antenna 220.

The third connection pattern CP3 and the fourth connection pattern CP4 are connected to both end portions, respectively, of the internal loop pattern that the first radiation pattern 212 and the second radiation pattern 213 constitute.

A first end portion of the third connection pattern CP3 is connected to a first end portion of the first radiation pattern 212 disposed on the innermost part of the loop into which the first radiation pattern 212 is formed. A second end portion of the third connection pattern CP3 is disposed on the upper surface of the base substrate 211 in such a manner as to face the terminal pattern T5. In this case, the third radiation pattern 214 is disposed between the second end portion of the third connection pattern CP3 and the terminal pattern T5.

A fourth end portion of the fourth connection pattern CP4 is connected to a second end portion of the first radiation pattern 212 disposed on the outermost part of the loop into which the first radiation pattern 212 is formed. A second end portion of the fourth connection pattern CP4 is disposed on the upper surface of the base substrate 211 in such a manner as to face the terminal pattern T6. In this case, the third radiation pattern 214 is disposed between the second end portion of the fourth connection pattern CP4 and the terminal pattern T6.

The fifth connection pattern CP5 and the sixth connection pattern CP6 are connected to both end portions, respectively, of the external loop coil that the second antenna 220 constitutes.

A first end portion of the fifth connection pattern CP5 is disposed in the accommodation space ES formed in the loop into which the first radiation pattern 212 is formed. The fifth connection pattern CP5 is connected, by soldering or the like, to a first end portion EP1 of the second antenna 220 inside the accommodation space ES. In this case, the fifth connection pattern CP5 to be disposed in the accommodation ES is formed in such a manner as to have a line-width W3 that is greater than a line-width W2 of the second antenna 220. The accommodation space ES here means a region where one portion, to the side of the first end portion EP1, of the second antenna 220 is stacked when the second antenna 220 is stacked on an upper surface of the first antenna 210.

The second end portion of the fifth connection pattern CP5 is disposed on the upper surface of the base substrate 211 in such a manner as to be spaced away from the terminal pattern T7. In this case, the third radiation pattern 214 is disposed between the second end portion of the fifth connection pattern CP5 and the terminal pattern T7.

A first end portion of the sixth connection pattern CP6 is disposed on its region that overlaps a second end portion EP2 of the second antenna 220. That is, the first end portion of the sixth connection pattern CP6 is disposed in a region where the second end portion EP2 of the second antenna 220 is stacked when the second antenna 220 is stacked on the upper surface of the first antenna 210.

The second end portion of the sixth connection pattern CP6 is disposed on the upper surface of the base substrate 211 in such a manner as to be spaced away from the terminal pattern T8. In this case, the third radiation pattern 214 is disposed between the second end portion of the sixth connection pattern CP6 and the terminal pattern T8.

In this manner, in the antenna module 200 for wireless power transmission and reception according to the second embodiment of the present disclosure, a connection pattern having a line-width greater than the line-width W2 of the second antenna 220 is disposed on a region that overlaps an end portion of the second antenna 220. Thus, the region that is brought into contact with or is coupled to the second antenna (coil) 220 is increased, thereby increasing the coupling strength between the first antenna 210 and the second antenna 220.

The second antenna 220 is configured as the coil-type antenna that is stacked, as the external loop coil of the antenna module 200 for wireless power transmission and reception, on the upper surface of the first antenna 210 (that is, the base substrate 211). In this case, both end portions of the second antenna 220 are connected, by soldering or the like, to the fifth connection pattern CP5 and the sixth connection pattern CP6, respectively, of the first antenna 210.

With reference to FIG. 16, the second antenna 220 is configured as the loop-type coil that is wound multiple times around a virtual winding axis. The first end portion EP1 of the second antenna 220 extends from the innermost part of the loop toward the direction of the virtual winding axis and is disposed at the center point of the loop. The first end portion EP1 of the second antenna 220 may be disposed adjacent to the center point of the loop.

The first end portion EP1 of the second antenna 220 is disposed on the inner circumference of the loop into which the coil is formed, and forms a connection electrode SP that is disposed in such a manner as to overlap the fifth connection pattern CP5 of the first antenna 210. The second end portion EP2 of the second antenna 220 is disposed on the outermost part of the loop into which the coil is formed, and is disposed in such a manner as to overlap the sixth connection pattern CP6 of the first antenna 210.

With reference to FIG. 17, the second antenna 220 is disposed on an upper surface of the first antenna 210. The connection electrode SP including the first end portion EP1 of the second antenna 220 is stacked on top of the fifth connection pattern CP5 of the first radiation pattern 212 and is connected, by soldering or the like, to the fifth connection pattern CP5.

In this case, the first end portion EP1 of the second antenna 220 is disposed adjacent to the center point of the first radiation pattern 212 (that is, the center point of the base substrate 211), and is disposed inward more than the innermost pattern of the loop into which the first radiation pattern 212 is formed. In other words, the first end portion EP1 of the second antenna 220 is disposed in the inner circumference region of the loop into which the internal loop pattern is formed.

Accordingly, the first end portion EP1 of the second antenna 220 does not overlap the fifth connection pattern CP5, and one portion of the connection electrode SP overlaps the fifth connection pattern CP5. The second antenna 220 is connected, by soldering or the like, to the fifth connection pattern CP5 at its region that overlaps the fifth connection pattern CP5. In this case, respective overlapping regions of the second antenna 220 and the fifth connection pattern CP5 are included in the accommodation space ES positioned inside the loop into which the first radiation pattern 212 is formed.

In this manner, in the antenna module 200 for wireless power transmission and reception according to the second embodiment of the present disclosure, the first end portion EP1 of the second antenna 220 extends toward the direction of the center point of the internal loop pattern (that is, the first radiation pattern 212) and is disposed in the inner circumference region of the internal loop pattern. The first end portion EP1 is connected, by soldering or the like, to the fifth connection pattern CP5 disposed in the accommodation space ES positioned inside the loop into which the first radiation pattern 212 is formed. Thus, the coupling strength between the first antenna 210 and the second antenna 220 may be increased.

In other words, in the antenna module 200 for wireless power transmission and reception according to the second embodiment of the present disclosure, the first end portion EP1 is connected, by soldering or the like, to the fifth connection pattern CP5, in a state of being positioned inward more than the first end portion EP1 of the second antenna 220. Thus, the coupling strength between the first antenna 210 and the second antenna 220 may be increased more than when the first end portion EP1 of the second antenna 220 is connected to the fifth connection pattern CP5.

The second end portion EP2 of the second antenna 220 is connected, by soldering or the like, to the sixth connection pattern CP6. The second end portion EP2 of the second antenna 220 is disposed in such a manner as to extend from the outermost part of the loop into which the coil is formed, toward the direction of a second end portion of the sixth connection pattern CP6. The second end portion EP2 of the second antenna 220 is disposed in such a manner as to overlap the sixth connection pattern CP6 and is connected, by soldering or the like, to the sixth connection pattern CP6.

In order to increase the coupling strength between the first antenna 210 and the second antenna 220, the second antenna 220 may be disposed in such a manner that an inner portion thereof the second antenna 220, rather than the second end portion, overlaps the sixth connection pattern CP6, and may be connected, by soldering or the like, to the sixth connection pattern CP6. In this case, in a case where the second end portion EP2 of the second antenna 220 overlaps a different connection pattern, a change may occur in the antenna characteristic. Therefore, the second end portion EP2 of the second antenna 220 is disposed in such a manner as not to overlap the connection pattern CP1 other than the sixth connection pattern CP6.

With reference to FIGS. 18 to 20, the antenna module 200 for wireless power transmission and reception may further include a first cover layer 230 and a second cover layer 240.

The first cover layer 230 is disposed on the upper surface of the first antenna 210. The first cover layer 230 is interposed between the upper surface of the first antenna 210 and the second antenna 220 and insulates patterns of the first antenna 210 from the second antenna 220.

A plurality of openings are formed in the first cover layer 230. That is, in order to connect the connection pattern of the first antenna 210 and the second antenna 220, a plurality of openings are formed for exposing the connection pattern or exposing the terminal pattern.

As an example, the first cover layer 230 includes a first opening OP1 to an eighth opening OP8.

The first opening OP1 is a hole for connecting the second antenna 220 and the fifth connection pattern CP5 and is formed in such a manner as to overlap one portion of the fifth connection pattern CP5. In this case, the first opening OP1 is formed in such a manner as to overlap one portion of the fifth connection pattern CP5 that is disposed in the accommodation space ES in the first antenna 210. In order to connect the first end portion EP1 of the second antenna 220 and the fifth connection pattern CP5, one portion of the fifth connection pattern CP5 disposed in the accommodation space ES is exposed through the first opening OP1.

The second opening OP2 is a hole for connecting the second antenna 220 and the sixth connection pattern CP6 and is formed in such a manner as to overlap one portion of the sixth connection pattern CP6. In order to connect the second end portion EP2 of the second antenna 220 and the sixth connection pattern CP6, one portion of the sixth connection pattern CP6 is exposed through the second opening OP2.

The third opening OP3 to the eighth opening OP8 are holes for connecting the antenna module 200 for wireless power transmission and reception to an external circuit substrate, and are formed at positions, respectively, that overlaps grounding patterns T5 to T0. The third opening OP3 is formed at a position that overlaps the terminal pattern T5, and at least one portion of the terminal pattern T5 is exposed through the third opening OP3. The fourth opening OP4 is formed at a position that overlaps the terminal pattern T6, and at least one portion of the terminal pattern T6 is exposed through the fourth opening OP4. The fifth opening OP5 is formed at a position that overlaps the terminal pattern T7, and at least one portion of the terminal pattern T7 is exposed through the fifth opening OP5. The sixth opening OP6 is formed at a position that overlaps the terminal pattern T8, and at least one portion of the terminal pattern T8 is exposed through the sixth opening OP6. The seventh opening OP7 is formed at a position that overlaps the terminal pattern T9, and at least one portion of the terminal pattern T9 is exposed through the seventh opening OP7. The eighth opening OP8 is formed at a position that overlaps the terminal pattern T0, and at least one portion of the terminal pattern T0 is exposed through the eighth opening OP8.

The second cover layer 240 is disposed on a lower surface of the first antenna 210. Through the second cover layer 240, the terminal patterns T5' to T0' are exposed that are disposed on the lower surface of the first antenna 210. That is, a stepped portion A is formed between adjacent two sides, among four sides of the second cover layer 240. The terminal patterns T5' to T0' are exposed through the stepped portion A formed in the second cover layer 240.

With reference to FIG. 21, the second antenna 220 is disposed on an upper surface of the first cover layer 230. The first end portion EP1 of the second antenna 220 is connected to the fifth connection pattern CP5 exposed through the first opening OP1. The second end portion EP2 of the second antenna 220 is connected to the sixth connection pattern CP6 exposed through the second opening OP2.

Accordingly, the antenna module 200 for wireless power transmission and reception includes the external loop coil in the shape of a loop that is configured with the second antenna 220, and the internal loop pattern in the shape of a loop that is configured with the first radiation pattern 212 and the second radiation pattern 213. The external loop coil and the internal loop pattern form their respective independent wireless power transmission and reception patterns.

As described above, in the antenna module 200 for wireless power transmission and reception according to the second embodiment of the present disclosure, the internal loop pattern is disposed in the inner circumferential region of the external loop coil, and the external loop coil and the internal loop pattern operate as respective independent wireless power transmission and reception patterns. Thus, the fixed charging recognition ratio can be provided over entire regions of the antenna module 200. Particularly, unlike in an antenna module 200 for wireless power transmission and reception in the related art that has an empty space in the center portion, in the antenna module 200 for wireless power transmission and reception according to the second embodiment of the present disclosure, although a small-sized device is disposed in the center portion thereof, respective overlapping regions of an antenna of the small-sized device and the antenna module 200 for wireless power transmission and reception are increased. Thus, the charging recognition ratio can be improved.

Only the preferred embodiments of the present disclosure are described above, but modifications thereto are possible in various forms. It would be understandable to a person of ordinary skill in the art that various modification and alteration examples are possibly practiced without departing from the scope of the claims.

The invention claimed is:

1. An antenna module for wireless power transmission and reception, the antenna module comprising:
 a base substrate;
 a first antenna having a first radiation pattern that is disposed on an upper surface of the base substrate and forms a first loop; and
 a second antenna stacked on the upper surface of the base substrate and having a coil that forms a second loop by being wound along an outer circumference of the first loop, wherein a first end portion of the second antenna and a first end portion of the first radiation pattern are connected to each other, and a second end portion of the second antenna and a second end portion of the first radiation pattern are connected to different terminal patterns, respectively.

2. The antenna module of claim 1, wherein a first end portion of the first radiation pattern extends from an outermost part of the first loop toward a direction of the center point of the first loop.

3. The antenna module of claim 2, wherein the first end portion of the first radiation pattern is disposed inside the first loop, and is disposed between an innermost pattern of the first loop and an outermost pattern of the first loop.

4. The antenna module of claim 2, wherein the first end portion of the first radiation pattern is a first connection electrode that has a greater line-width than a width of the first radiation pattern, and that is disposed inside the first loop.

5. The antenna module of claim 2, wherein the first radiation pattern takes a detour on a lower surface of the base substrate at a region on which the first end portion is disposed among entire region of the first loop.

6. The antenna module of claim 2, wherein the first antenna further includes a second radiation pattern that is disposed on a lower surface of the base substrate and forms a detour route of the first radiation pattern at a region on which the first end portion of the first radiation pattern is disposed among an entire region of the first loop.

7. The antenna module of claim 1, wherein the second antenna is bent at an innermost part of the second loop toward a direction of a center point of the second loop, and overlaps a first connection electrode of the first radiation pattern disposed inside the first loop.

8. The antenna module of claim 7, wherein a first end portion of the second antenna is disposed in an inner circumference region of the first loop.

9. The antenna module of claim 1, further comprising:
a first connection pattern disposed on the upper surface of the base substrate and passes through the first loop to be connected to a second end portion of the first radiation pattern disposed on an innermost part of the first loop; and
a second connection pattern disposed on the upper surface of the base substrate and connected to a second end portion of the second antenna that is disposed at outermost part of the second loop.

10. The antenna module of claim 1, further comprising:
a first cover layer interposed between the first radiation pattern and the second antenna, and having an opening formed in a region overlapping the first connection electrode of the first radiation pattern.

11. The antenna module of claim 1, wherein the first radiation pattern includes a plurality of radiation lines, and an accommodation space, which is a region where the plurality of radiation lines are spaced away to face each other, is defined in the first loop.

12. The antenna module of claim 11, wherein the accommodation space extends from an outermost part of the first loop toward a direction of the center point of the first loop.

13. The antenna module of claim 12, wherein the accommodation space does not pass through the first loop.

14. The antenna module of claim 11, further comprising:
a connection pattern having a greater line-width than a line-width of the first radiation pattern and the second antenna, and having a first end portion disposed in the accommodation space.

15. The antenna module of claim 11, wherein the first radiation pattern detours on the lower surface of the base substrate in the region defined as the accommodation space.

16. The antenna module of claim 11, wherein the first antenna further comprises:
a second radiation pattern disposed on a lower surface of the base substrate and forming a detour route of the first radiation pattern at the region defined as the accommodation space, among all regions of the first loop.

17. The antenna module of claim 11, wherein the second antenna is bent at an innermost part of the second loop toward a direction of the center point of the second loop and overlaps a connection pattern disposed in the accommodation space, and a first end portion of the second antenna is disposed in an inner circumference region of the first loop.

18. The antenna module of claim 11, wherein the first radiation pattern and the second antenna are connected to different terminal patterns, respectively.

19. The antenna module of claim 11, further comprising:
a first cover layer interposed between the first radiation pattern and the second antenna, and having an opening formed in a region overlapping the accommodation space.

* * * * *